United States Patent
Cordery et al.

(10) Patent No.: US 7,995,246 B2
(45) Date of Patent: *Aug. 9, 2011

(54) DETECTING PRINTED IMAGE COPIES USING PHASE-SPACE-ENCODED FRAGILE WATERMARK

(75) Inventors: Robert A. Cordery, Danbury, CT (US); Claude Zeller, Monroe, CT (US); Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 2061 days.

This patent is subject to a terminal disclaimer.

(21) Appl. No.: 10/720,292

(22) Filed: Nov. 24, 2003

(65) Prior Publication Data

US 2005/0111027 A1 May 26, 2005

(51) Int. Cl.
*H04N 1/40* (2006.01)

(52) U.S. Cl. ......... 358/3.28; 382/100; 713/176; 380/54; 380/55; 380/200; 380/201; 380/216; 283/113

(58) Field of Classification Search ............. 358/3.28; 382/100; 713/176; 380/54–55, 200–201, 380/216; 283/113
See application file for complete search history.

(56) References Cited

U.S. PATENT DOCUMENTS

| | | | |
|---|---|---|---|
| 4,881,268 A * | 11/1989 | Uchida et al. ............ | 382/135 |
| 4,910,460 A | 3/1990 | Sebok | |
| 5,825,892 A | 10/1998 | Braudaway et al. | |
| 6,185,312 B1 * | 2/2001 | Nakamura et al. .......... | 382/100 |
| 6,317,115 B1 | 11/2001 | Yokomizo | |
| 6,332,030 B1 * | 12/2001 | Manjunath et al. ......... | 382/100 |
| 6,332,194 B1 | 12/2001 | Bloom et al. | |
| 6,385,329 B1 | 5/2002 | Sharma et al. ............. | 382/100 |
| 6,711,276 B1 * | 3/2004 | Yoshiura et al. ........... | 382/100 |
| 6,728,408 B1 * | 4/2004 | Echizen et al. ............. | 382/232 |
| 6,804,379 B2 * | 10/2004 | Rhoads .................... | 382/101 |
| 6,823,455 B1 * | 11/2004 | Macy et al. ................ | 713/176 |
| 6,993,151 B2 * | 1/2006 | Tsai et al. ................. | 382/100 |
| 7,065,237 B2 * | 6/2006 | Murakami ................. | 382/137 |
| 7,154,560 B1 * | 12/2006 | Chang et al. .............. | 348/598 |
| 2001/0040979 A1 | 11/2001 | Davidson et al. .......... | 382/100 |
| 2002/0126870 A1 * | 9/2002 | Wendt ..................... | 382/100 |
| 2002/0138974 A1 * | 10/2002 | Suhara et al. .............. | 29/740 |
| 2002/0157005 A1 | 10/2002 | Brunk et al. .............. | 713/176 |
| 2002/0176114 A1 | 11/2002 | Zeller et al. ............... | 358/3.28 |
| 2003/0026453 A1 * | 2/2003 | Sharma et al. ............. | 382/100 |
| 2003/0053653 A1 * | 3/2003 | Rhoads .................... | 382/100 |
| 2003/0159046 A1 | 8/2003 | Choi et al. ................. | 713/176 |

(Continued)

FOREIGN PATENT DOCUMENTS

WO 03/012727 A1 2/2003

*Primary Examiner* — Chan S Park
*Assistant Examiner* — Jacky X Zheng
(74) *Attorney, Agent, or Firm* — Steven J. Shapiro; Charles R. Malandra, Jr.

(57) ABSTRACT

The present invention is concerned with detection of a "fragile watermark" in a printed image to aid in a determination whether a document under examination is an original or a copy. The watermark may be applied by phase-space encoding data to be included in the watermark. The image may be examined on a block-by-block basis after scanning. Correlation of detected watermark strength with block brightness and/or with wave vectors used for encoding may be used to detect that the image is a copy.

18 Claims, 7 Drawing Sheets

U.S. PATENT DOCUMENTS

| | | | |
|---|---|---|---|
| 2003/0215112 A1* | 11/2003 | Rhoads et al. | 382/100 |
| 2004/0030899 A1* | 2/2004 | Lee et al. | 713/176 |
| 2004/0105569 A1* | 6/2004 | Sharma et al. | 382/100 |
| 2004/0153649 A1 | 8/2004 | Rhoads et al. | 713/176 |
| 2004/0236951 A1 | 11/2004 | Zhao | 713/179 |
| 2005/0114668 A1* | 5/2005 | Haas et al. | 713/176 |
| 2006/0045306 A1* | 3/2006 | Cordery et al. | 382/100 |

* cited by examiner

DETECTING PRINTED IMAGE COPIES USING PHASE-SPACE-ENCODED FRAGILE WATERMARK

CROSS REFERENCE TO RELATED APPLICATIONS

Reference is made to commonly assigned copending patent application Ser. No. 10/720,664 filed herewith entitled "Fragile Watermark for Detecting Printed Image Copies" in the names of Robert A. Cordery, Claude Zeller and Bertrand Haas; and Ser. No. 10/720,503 filed herewith entitled "Watermarking Method with Print-Scan Compensation" in the name of Bertrand Haas.

BACKGROUND

This invention relates generally to the field of printed document security, and, more particularly, to detection of a watermark in a printed image to determine whether the printed image is an original or a copy.

Advances in the arts of photocopying and digital image scanning and printing have made it increasingly easy to make copies of printed documents with rather high fidelity such that it is difficult to distinguish between an original printed document and a photocopy or scanned-and-printed copy of the original document. These advances have implications in regard to such secure documents as postage meter indicia, paper currency, and event and travel tickets. Therefore, it is desirable to provide secure documents with printed images that incorporate special features, sometimes referred to as "fragile watermarks", wherein copying of the printed image results in changes of the feature in the copy relative to the original image in a manner that can be detected with a degree of reliability and convenience.

SUMMARY

Accordingly, methods are provided for examining a printed image to determine an extent to which a fragile watermark is present in the printed image.

In one aspect, a method is provided for determining whether a printed-image-under-examination (PIUE) is a copy of an original printed image. The method includes scanning the PIUE to generate scanned image data. The scanned image data includes pixel data, and the pixel data includes gray scale values and represents the PIUE as a set of scanning pixels. The method further includes forming a plurality of data blocks from the scanned image data. Each data block consists of pixel data which corresponds to a respective region of the PIUE. The method also includes transforming the pixel data in at least some of the data blocks to obtain transform domain data. The method further includes applying a watermark detecting operation to the transform domain data for respective ones of the data blocks to generate recovered watermark data. In addition, the method includes determining a correlation between the recovered watermark data for at least some of the data blocks and brightness levels for the data blocks.

It may be determined that the PIUE is a copy of the original printed image if the strength of the recovered watermark data is negatively correlated with the brightness levels for the data blocks.

The obtaining of the transform domain data may include applying at least one of a Fourier transform, a fast Fourier transform, a discrete cosine transform (DCT) and a wavelet transform to the pixel data.

The watermark detecting operation may include multiplying the transform domain data with a detecting function and applying an envelope function and then applying an inverse transform. The detecting function may be $e^{ikr}$, where k and r are phase space indices that are applicable to the transform domain data.

The PIUE may be part of a postal indicium, and the regions of the PIUE to which the data blocks correspond may at least partially overlap with each other.

In a further aspect, a method is provided for determining whether a printed-image-under-examination (PIUE) is a copy of an original printed image. The original printed image includes a watermark applied to the image using a plurality of wave vectors. The method includes scanning the PIUE to generate scanned image data. The scanned image data includes pixel data, and the pixel data includes gray scale values and represents the PIUE as a set of scanning pixels. The method further includes forming a plurality of data blocks from the scanned image data. Each data block consists of pixel data which corresponds to a respective region of the PIUE. The method also includes transforming the pixel data in at least some of the data blocks to obtain transform domain data. The method further includes applying a watermark detecting operation to the transform domain data for respective ones of the data blocks to generate recovered watermark data. In addition, the method includes determining at least one of (i) a correlation between the recovered watermark data for at least some of the data blocks and brightness levels for the data blocks, and (ii) a correlation between the recovered watermark data and the wave vectors.

In another aspect, a method of applying a watermark to an image includes providing image data that represents the image, and providing a message string that includes a plurality of message bits. The method further includes arraying the message bits of the message string at points of a D4 lattice, the lattice being formed as a product of a two-dimensional position-domain lattice and a two-dimensional frequency-domain lattice. The method also includes generating watermark image data by convolving each of the message bits with a respective watermark function in accordance with a position of the respective bit in the D4 lattice. In addition, the method includes combining the watermark image data with the original image data to generate combined image data.

Pixel values of the combined image data may be transformed, and an image may be printed using the transformed pixel values.

The arraying of the message bits may be performed such that the message bits are arrayed only at lattice points having indices that sum to an even number, or only at lattice points that sum to an odd number.

Each of the watermark functions may be formed by multiplying a sinusoid with an envelope function.

A fragile watermark applied with phase-space encoding may reveal copying of an original document since copying may degrade the strength of the watermark in correlation with brightness levels of parts of the image and/or in correlation with shorter wave lengths of the watermark. By detecting such correlation, a document examination process may be able to conveniently and reliably identify images that are copies rather than originals.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In the method of the present invention, a watermark that is encoded in phase space is impressed on a gray scale image. The watermark is such that the distortions that result from scanning and reprinting from scanned data tend to weaken the strength of the watermark in correlation with brightness levels found in the image and in correlation with wave vectors used to encode the watermark. To determine whether a printed document is an original with the watermark substantially intact, or a copy in which the watermark has been compromised, the printed document is scanned, and a block-by-block analysis of the resulting data is performed to determine whether variations in strength in the recovered watermark correlate with image brightness or with the encoding wave vectors.

Figure 1:
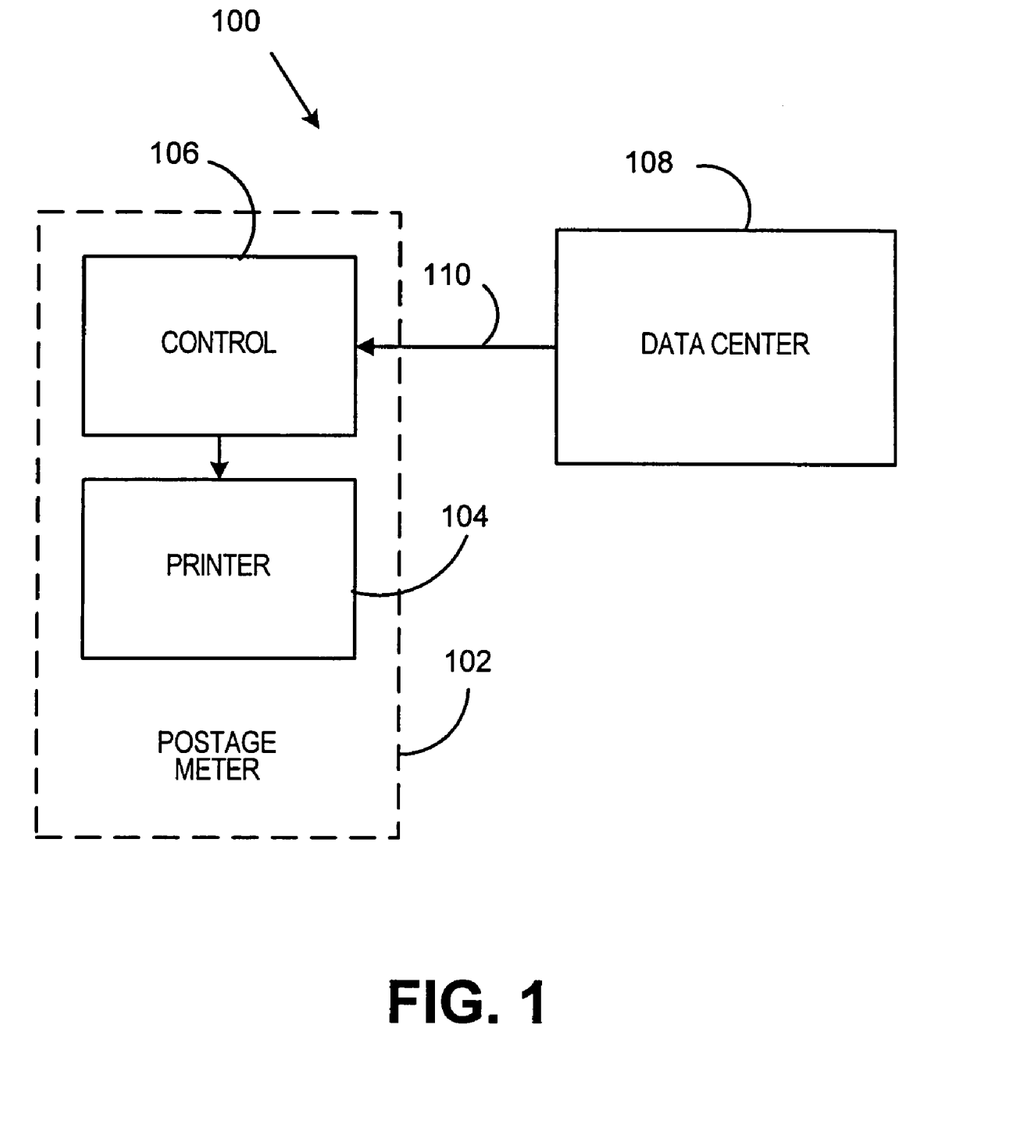
FIG. 1 is a block diagram that illustrates an apparatus provided in accordance with the invention for incorporating a phase-space encoded fragile watermark in an image that is part of a postage meter indicia.

Referring now to the drawings, and particularly to FIG. 1, the reference numeral 100 indicates generally an apparatus for printing watermarked images in accordance with principles of the present invention. The printing apparatus 100 includes a postage meter 102. The postage meter 102, in turn, includes a printer 104 and control circuitry 106 that is coupled to, and controls operation of, the printer 104. (Although embodiments of the present invention are described herein in the context of postage metering, those who are skilled in the art will recognize that the methods of the invention may also be applied to production and verification of other types of secure documents, including paper currency, travel and event tickets, and identification documents.) The printer 104 may be of a type that is capable of printing gray scale images. For example, the printer 104 may include a dye-sublimation printer. In some embodiments, the printer may be capable of printing 32 or 256 gray levels.

The printing apparatus 100 also includes a data center 108 that is in communication with the control circuitry 106 of the postage meter 102 via a data communication channel 110. The data center 108 may generate a watermarked image in accordance with the invention, and may download to the postage meter 102 image data which represents the watermarked image. Using the downloaded image data, the postage meter 102 may print the watermarked image as a part of postage meter indicia applied to mailpieces, which are not shown. Thus the mailpieces, and particularly the postage meter indicia thereon, may constitute original documents which a postal authority may wish to verify.

Figure 2:
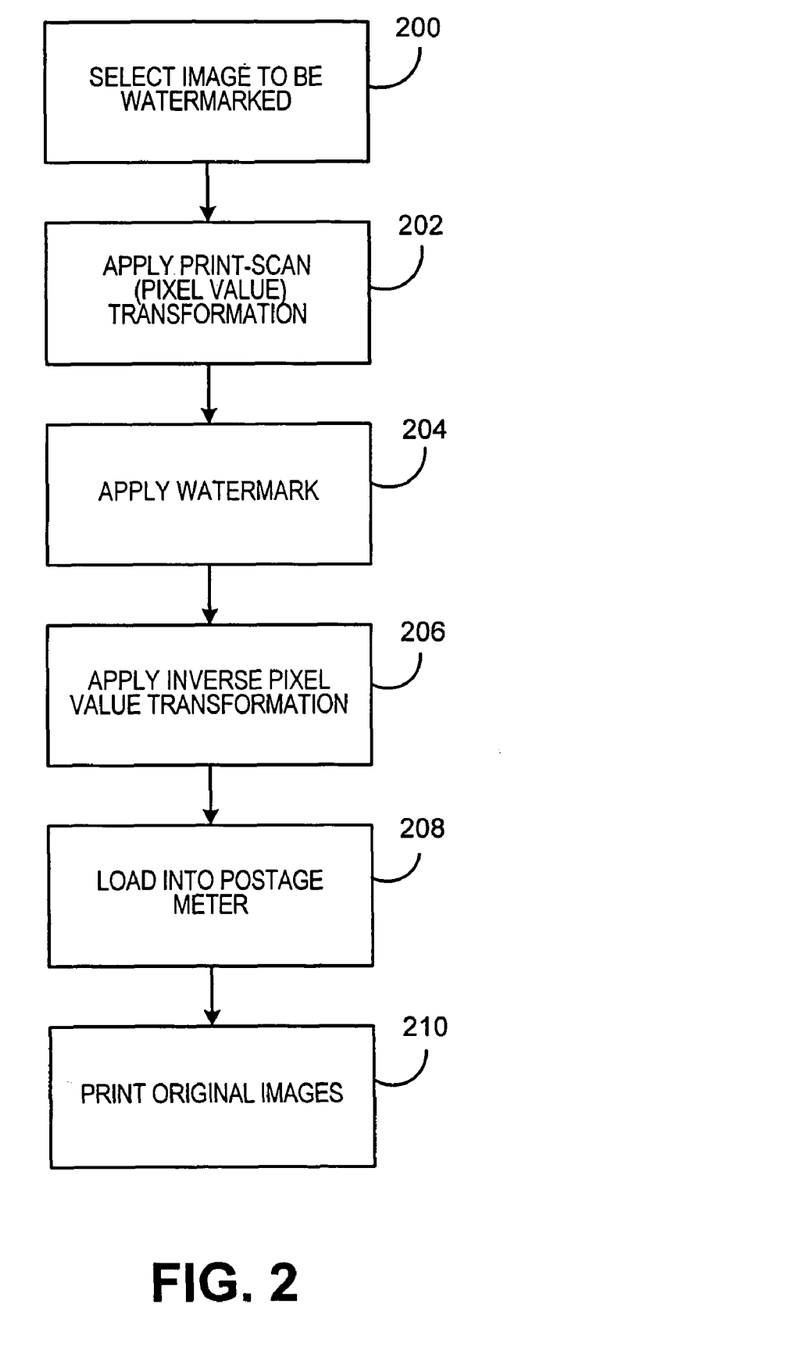
FIG. 2 is a flow chart that illustrates a process that may be provided in accordance with the invention for generating and printing watermarked images.

FIG. 2 is a flow chart that illustrates a process performed in accordance with the invention in the printing apparatus 100 of FIG. 1. In somewhat summary form, a watermarking process according to the invention may include preparing the image to receive the watermark, constructing the watermark using a set of wavepackets centered on points in a lattice, adding the watermark to the image and post-processing the watermarked image to prepare the watermarked image for printing. A processing according to the invention is now described in more detail with reference to FIG. 2.

Initially, at step 200, an image is selected for watermarking. In some embodiments the image may be a standard image that is required to be printed as part of every postage meter indicia by every postage meter, or by every postage meter that is part of a program for incorporating a gray scale image in postage meter indicia. In other embodiments, the image may be one of a number of standard images, any one of which may be selected by the lessor of a postage meter as the image to be incorporated in indicia to be printed by the particular postage meter. In still other embodiments, the image may be a gray scale image that is chosen by the lessor of the postage meter from among images available for purchase or licensing, or may be generated by the lessor of the postage meter. In these cases, the selected image may be sent by the lessor of the postage meter to the data center for watermarking so that the image can be incorporated in indicia to be printed by the particular postage meter.

In some embodiments, the image to be watermarked may be represented by pixel data that represents, with respect to each pixel of the image, a gray scale level. The number of available gray scale levels may be 256, in some embodiments. In such embodiments, each pixel may be represented by one 8-bit byte of image data, and the value of each pixel may be an integer n, with n greater than or equal to zero and less than or equal to 255. Each value of n may correspond to a different gray scale level; in some embodiments the zero value corresponds to white (no tone), the value 255 corresponds to black, and each value of n corresponds to a tone which is darker than the tone which corresponds to n minus one.

In some cases it may be desirable to prepare the selected image before applying the watermark. For example, the contrast in the image may be reduced, low pass filtering may be applied to remove image features which may interfere with the watermark, and the resolution and format of the image may be converted to match a standard resolution and format.

A bitmap image has a limited grayscale often given as integers in a range such as 0-255 for an 8-bit depth image. The grayscale is a representation of the reflectance with 0 representing black or 0 reflectance and 1 representing white or 100% reflectance. The image may be filtered to remove features that interfere with the watermark. To simplify image processing calculations, the filtered image may be converted to the range [0, 1]. One simple type of linear filter is to Fourier transform the image, multiply each Fourier component by a factor which is 1 for long wavelength Fourier components and smaller for shorter wavelength components and then apply the inverse Fourier transform to the result. This process is equivalent to convolving the image with a blur function.

The Fourier transform and the inverse Fourier transform of an image I are $$FI = \mathscr{F}(I) = N \sum_x \sum_y e^{-i(xk_x + yk_y)} \cdot I(x, y)$$

$$I = \mathscr{F}^{-1}(FI) = N' \sum_{k_x} \sum_{k_y} e^{i(xk_x + yk_y)} \cdot FI(k_x, k_y)$$

where the normalization constants N and N' are chosen so that the inverse is correct.

Often the image pixels are on a rectangular lattice in position space with coordinates $(x, y) = (n_x/dpi_x, n_y/dpi_y)$, where $n_x$ and $n_x$ are integers. A good choice that behaves well in the continuum limit is N equals the area per pixel $1/(dpi_x dpi_y)$. With this choice and cyclic boundary conditions, if the image size is $L_x$ by $L_y$, then $(k_x, k_y) = 2\pi(m_x/L_x, m_y/L_y)$, and $N' = 1/(L_x L_y)$, where $m_x$ and $m_y$ are integers. N' is then the volume per wave vector times $1/(2\pi)^2$. Other choices for normalization may be used.

Figure 3:
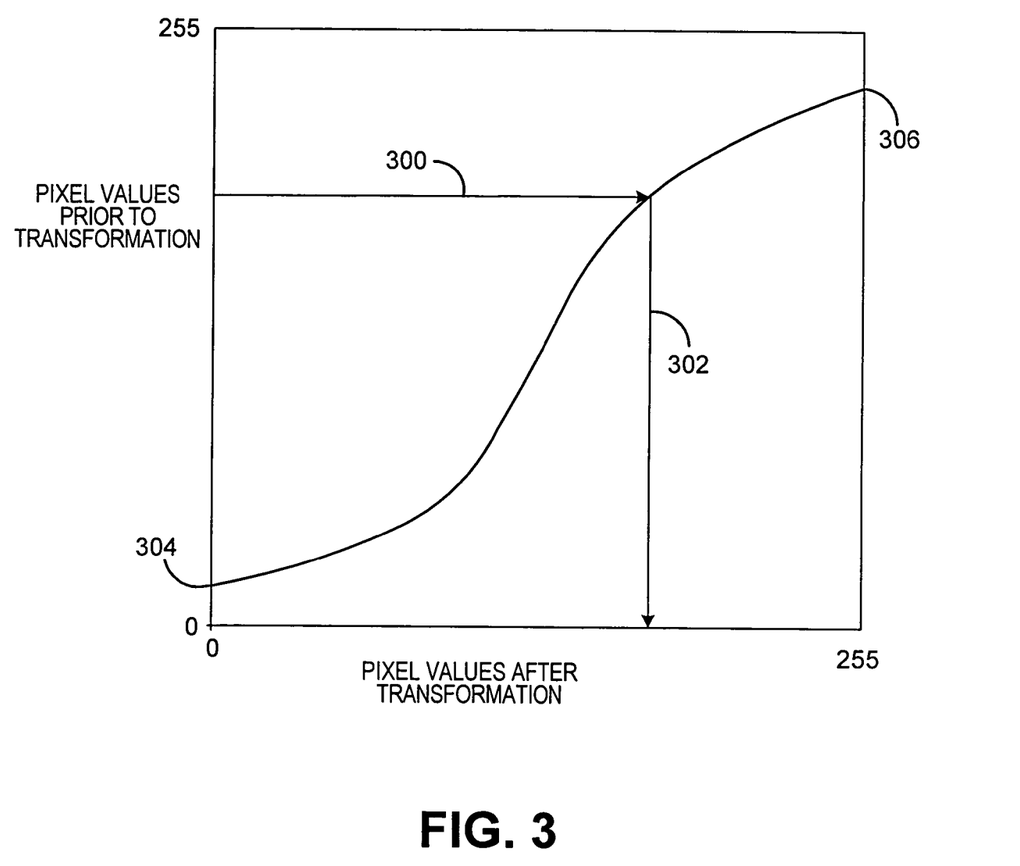
FIG. 3 is a graph that illustrates a transformation that may be applied to pixel values of an image to simulate changes in pixel values that may result from scanning a printed grayscale image and then printing a copy of the image using data generated by the scanning of the printed image.

Following step 200 is step 202. At step 202 a pixel value transformation may be applied to the image data which corresponds to the image. The transformation may substantially approximate the effect on pixel values of first printing the image with the type of printer employed in the postage meter, and then scanning the resulting image with a scanner of the type which is to be employed to verify the postage indicia. FIG. 3 is a graph that illustrates an example of the transformation that may be applied at step 202. In the graph of FIG. 3, the vertical axis corresponds to pixel values prior to transformation, and the horizontal axis corresponds to pixel values to which the prior values are mapped by the transformation. Arrow 300 represents a particular pixel gray scale value that is to be transformed, and arrow 302 represents the gray scale value of the pixel after transformation. The possible pixel values to be transformed may be restricted to a range defined by a minimum gray scale level 304 that the printer is able to produce and a maximum gray scale level 306 that the printer is able to produce. The pixel value range may be scaled to allow head room for addition of watermark data to the pixel-value-transformed image data.

Step 204 follows step 202 in FIG. 2. At step 204 a watermark is applied, in accordance with principles of the present invention, to the image selected at step 200, as transformed at step 202.

Figure 4:
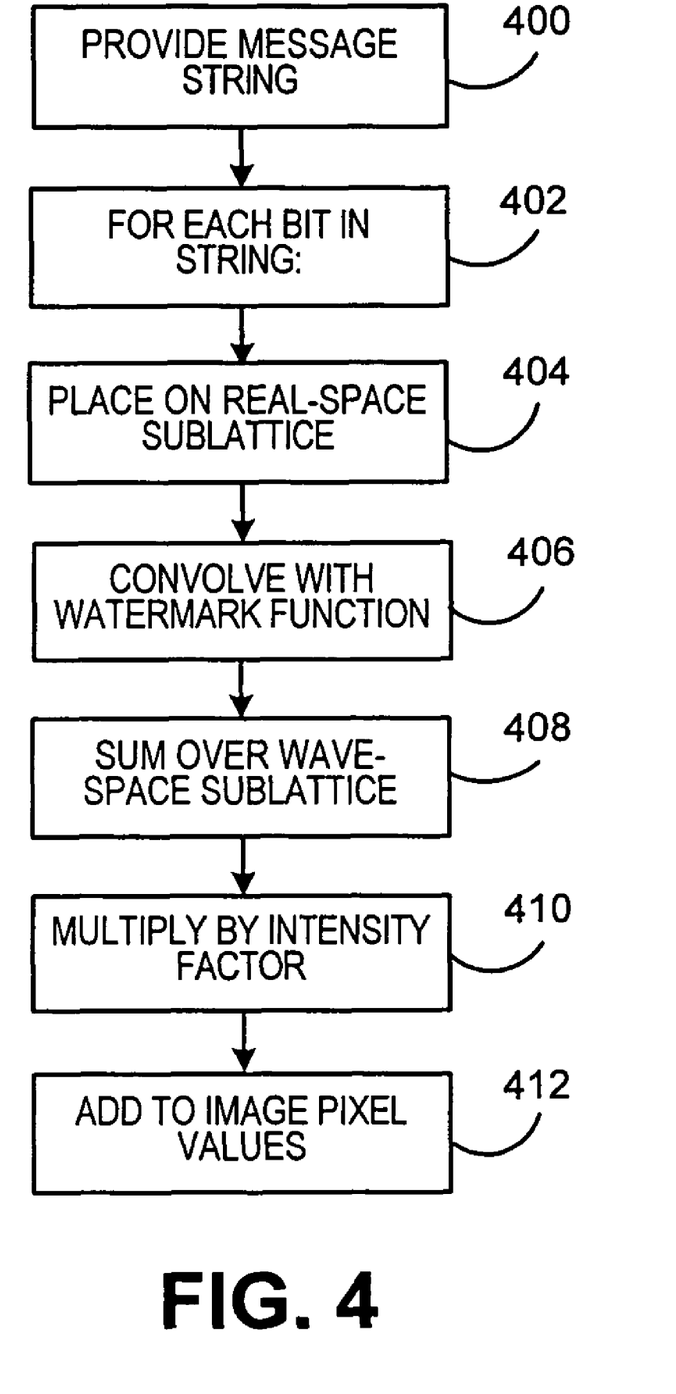
FIG. 4 is a flow chart that illustrates some details of a step of the process of FIG. 2.

FIG. 4 is a flow chart that illustrates some details of the watermarking operation represented by step 204 in FIG. 2. At 400 in FIG. 4, a message string is provided. The message string may represent data such as postage meter serial number, location of mailing, etc. The bits of the message string may be arrayed at points in a watermark lattice. The watermark lattice may be a subset of a 4-dimensional lattice. The D4 lattice has the densest packing in 4 dimensions and so is a preferred lattice for encoding data. A convenient representation of the D4 lattice is a sublattice of the 4-dimensional hypercubic lattice with integer coordinates (j, k, m, n). The points on the hypercubic lattice with j+k+m+n even form a D4 lattice. Alternatively, a D4 lattice formed of the points on the hypercubic lattice with j+k+m+n odd may be used. By using one of such "checkerboard" lattices, the wave vectors used in adjacent cells may be different, thereby aiding in recovery of the watermark upon scanning and analysis of the printed image.

A 4-dimensional continuous phase-space is the product of the 2-dimensional image position space and the 2-dimensional wave vector space of the Fourier transform of the image. The coordinates of position space are the coordinates (x, y) of the image pixels. The coordinates of wave vector space are the $(k_x, k_y)$ wave vector of the Fourier transform. The coordinates of phase space are then $(x, y, k_x, k_y)$.

An injection I is defined from the watermark lattice into the phase-space. The injection defines for each point on the watermark lattice a corresponding point in the phase space and thus a corresponding position and wave vector. A preferred injection is a linear map $$\begin{bmatrix} x \\ y \\ k_x \\ k_y \end{bmatrix} = M \begin{bmatrix} i \\ j \\ m \\ n \end{bmatrix} + \begin{bmatrix} x^0 \\ y^0 \\ k_x^0 \\ k_y^0 \end{bmatrix}$$

where M is a matrix. One form for M is a diagonal matrix with diagonal (celldim, celldim, kdim, kdim) where celldim is the spacing between cells and kdim is spacing in wave vector space of the wavepackets. A wavepacket that is very tightly localized in wave vector space is spread out in position space and vice versa. There is a constraint from Fourier transform theory that celldim·kdim>2π. This constraint places a limit on the number of wave vectors that can be used for a given cell dimension.

More specifically, for each bit in the array, steps 404 and 406 may be performed, as indicated at 402. At step 404 the data value corresponding to the bit is placed on the real-space sublattice in accordance with the indices rx, ry, then the data value is convolved with a watermark function (step 406). The watermark function may be, in some embodiments, a wavepacket. In other embodiments the watermark function may be a wavelet function. A wavepacket may be defined centered on each point in the range of the injection. This wavepacket may be concentrated in a limited wave vector range and a limited position range. A simple form for the wavepacket is $Env(x, y) \sin(k_x x + k_y y + \phi)$. Preferably, $Env(x, y)$ is concentrated in a region with dimensions similar to the basis vectors of the rectangular lattice in position space defined by the injection. One choice for Env is a Gaussian. It is preferable to choose Env so that it is continuous and the sum over the two-dimensional lattice points I of $Env(x - I_x, y - I_y)$ is equal to one independent of x and y. This is referred to as a partition of unity.

It is desirable to have the watermark fairly uniformly distributed over the image, without high peaks due to coherent adding of different wavepackets. The choice of φ can influence the uniformity of the watermark and can be selected based on a modest amount of experimentation to produce the most uniform watermarks.

The lattice to be used in arraying the message bits may utilize values of kx, ky selected so as to avoid very short wavelengths and also to avoid long wavelengths at which the watermark and the image may interfere. The spacing of the real-space indices rx, ry may be selected to produce a cell size that is sufficiently large to allow for successful filtering of the watermark features. A typical cell size (i.e. block size) may be 20 pixels by 20 pixels. It is believed that a cell size of less than 10 pixels by 10 pixels may not produce satisfactory results. The blocks may overlap with each other (i.e., need not be discrete).

After steps 404 and 406 have been performed with respect to all of the bits of the message string, step 408 follows. At step 408, the convolution data generated at step 406 is summed over the values of ky, kx to produce watermark data that represents a watermark "image". Then, at step 410, the watermark is multiplied by a constant so that the maximum and minimum values are within the range [−S, S] where S is a parameter substantially less than 1. Larger values of S>0.2 may result in fairly obvious watermarks whereas smaller values less than 0.05 may result in watermarks that may be difficult to detect. The result is then added (step 412) on a pixel by pixel basis to the transformed image data that resulted from step 202.

After step 412 is performed, the application of the watermark indicated by step 204 in FIG. 2 is complete. Step 206 of FIG. 2 then follows. At step 206, the watermarked image is subjected to a pixel value transformation that is the inverse of the pixel value transformation that was applied at step 202.

With the completion of step 206, the watermarked image data is now in condition for use in printing images, and may be loaded into the postage meter 102 (FIG. 1), as indicated at step 208 in FIG. 2. For example, the watermarked image data may be downloaded from the data center 108 to the control circuitry 106 of the postage meter 102 via the data communication channel 110. (Transmission of the watermarked image data from the data center 108 to the postage meter 102 may be protected by encryption.) Alternatively, the image data may be copied onto a floppy disk or other transportable data storage medium. The storage medium may then be mailed to the lessor of the postage meter and used to load the watermarked image data into the postage meter.

In any event, once the watermarked image data is present in the postage meter 102, the control circuitry 106 may control the printer 104 to print watermarked images (step 210, FIG. 2), based on the watermarked image data, as part of postage meter indicia applied to mailpieces. Depending on the intensity of the watermark and the wave vectors selected for encoding, and also depending on the image to which the watermark is applied, the watermark may not visibly modify the printed image, but under magnification the watermark may be discernable as a network of moiré patterns across the image. The watermark data can be normalized so as to center around zero so that the watermark has no net effect on the gray scale level of the image.

In accordance with conventional practices, the postage meter indicia may include other information, including, e.g., postage amount, date, mailing location, postage meter serial number (all in human-readable form), a two-dimensional barcode, etc.

Figure 5:
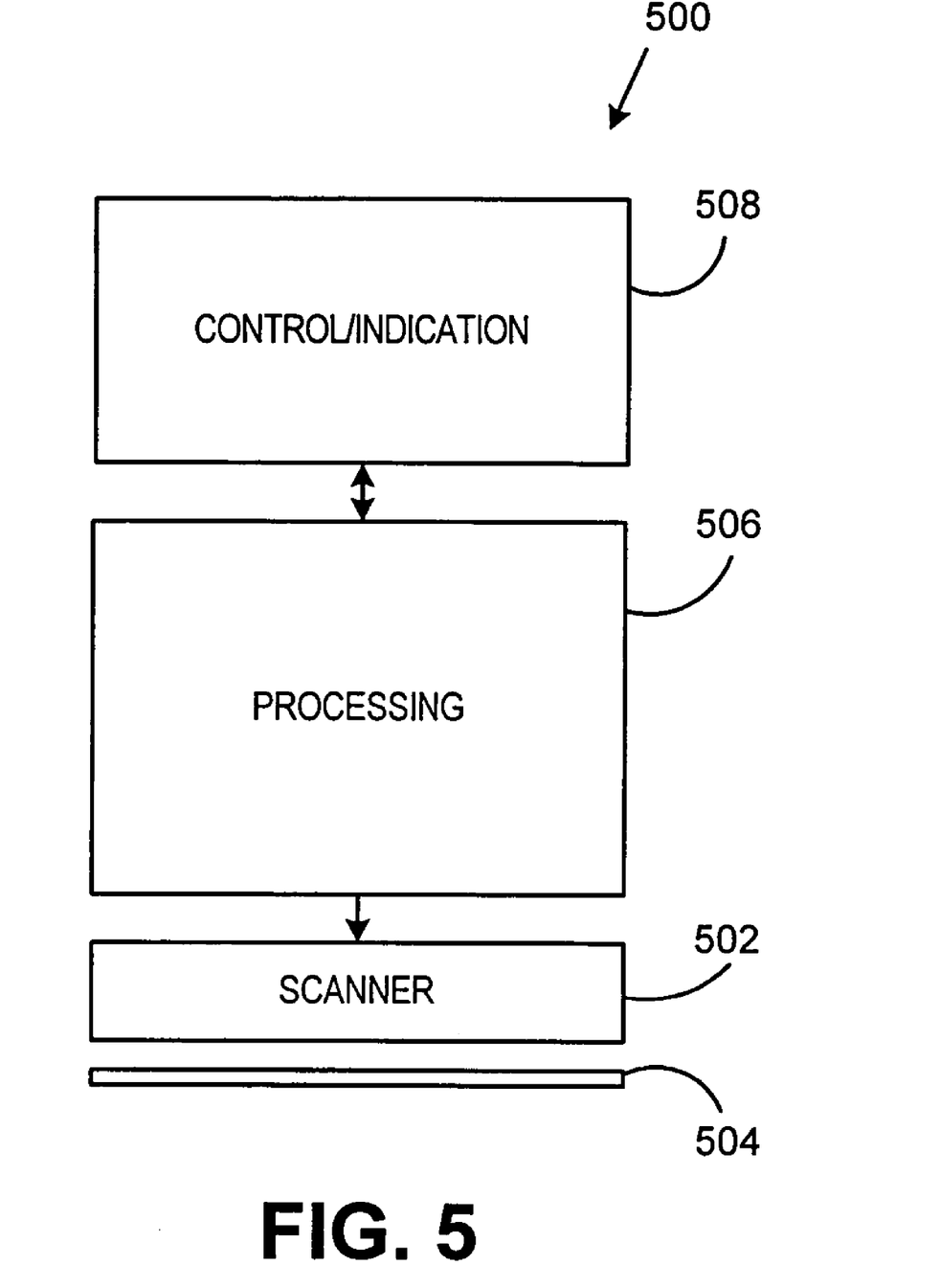
FIG. 5 is a block diagram of an apparatus that may be provided in accordance with the invention to examine printed images to determine whether the printed images are originals or copies.

FIG. 5 is a block diagram of an image examination apparatus 500 that may be provided in accordance with the invention to examine printed images (e.g., images included in postage indicia or purported indicia) to determine whether the printed images are originals or copies.

The image examination apparatus 500 may include a scanner 502 to scan a substrate 504 (e.g., a mailpiece) to generate scanned image data that represents a gray scale image (not separately shown) carried on the substrate 504. The printed gray scale image scanned by the scanner 502 may be referred to as the "printed-image-under examination" or "PIUE".

The image examination apparatus 500 further includes a processing block 506 that is coupled to the scanner 502. The processing block 506 may process scanned image data generated by the scanner 502, and may store scanned image data in a memory that is not separately shown and that may be part of the processing block 506. The processing block 506 may include program storage memory as well as working memory.

The image examination apparatus 500 may further include a functional block 508 by which a user may enter signals to control operation of the image examination apparatus 500. The block 508 may also allow the image examination apparatus 500 to provide an indication of a result of the examination of the PIUE.

Figure 6:
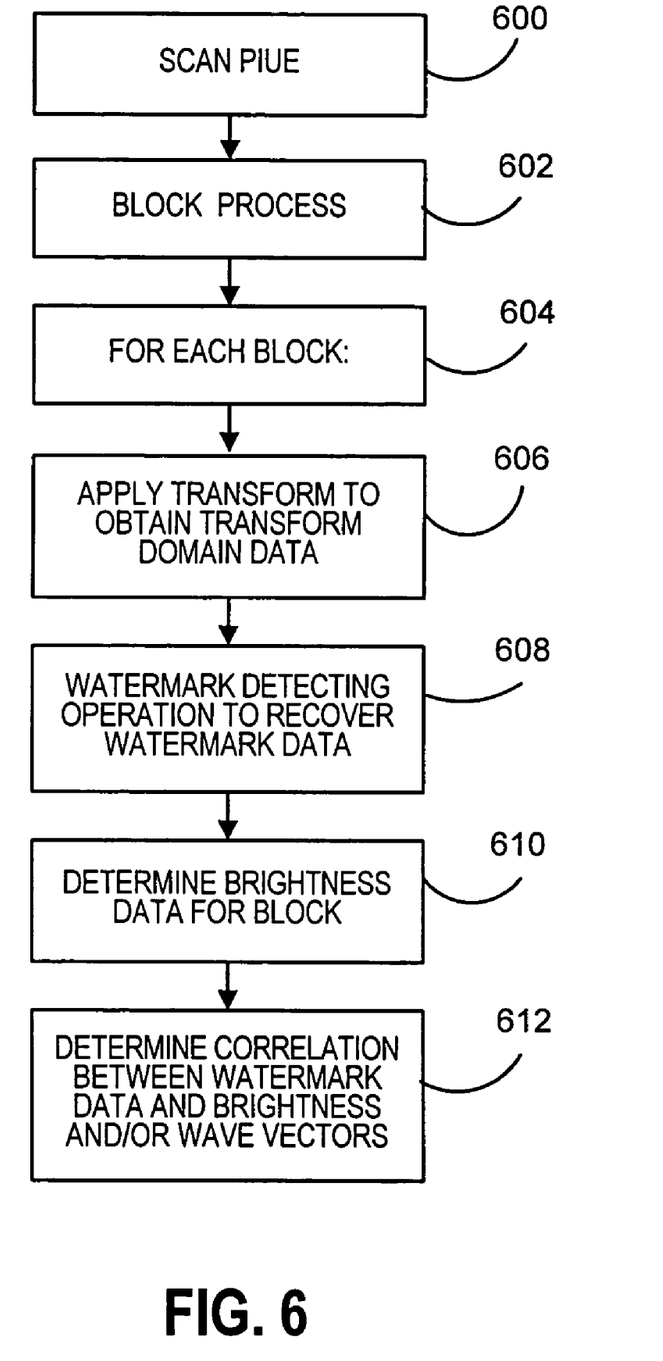
FIG. 6 is a flow chart that illustrates a process that may be provided in accordance with the invention to examine a printed image to determine whether the printed image is an original or a copy.

FIG. 6 is a flow chart that illustrates a process that may be performed in accordance with the invention by the image examination apparatus 500 of FIG. 5 to examine a PIUE to determine whether the PIUE is an original or a copy. In somewhat summary form, a process in accordance with the invention for detecting whether the PIUE is an original or a copy may include scanning the PIUE, detecting the watermark wavepackets in the scanned PIUE, measuring the strength of the wavepackets versus the background intensity and versus the wavelength of the watermark and applying a classification algorithm to determine whether the watermark is an original or a copy.

According to a first step 600 in the process of FIG. 6, the apparatus 500 scans the PIUE via the scanner 502 to generate scanned image data. The scanned image data is made up of pixel data that is constituted by gray scale values and represents the PIUE as a set of scanning pixels.

Following step 600 is step 602, at which the scanned image data is divided into data blocks. The data blocks may correspond to the real-space sublattice of the phase-space lattice that was used to encode the watermark in the image data that was provided for printing by the postage meter. In some embodiments, the data blocks may be overlapping.

Next, as indicated at 604, each of steps 606, 608 and 610 may be performed with respect to each of the data blocks formed at step 602.

Thus, for a particular block, step 606 indicates that a transform is applied to the pixel data of the data block to obtain transform domain data therefrom. In some embodiments the transform is a fast Fourier transform. Other transforms may alternatively be used, such as a Fourier transform, a discrete cosine transform (DCT) or a wavelet transform. Next, at step 608, a watermark detecting operation is applied to the transform domain data obtained at step 606. The detection of the watermark includes convolving the scanned image with a detection function. The detection function has the form EnvD (x, y) exp[i($k_x$x+$k_y$y)]. Here EnvD is a similar function to Env. The absolute value of the correlation function shows peaks when the detection function is centered on the watermark wavepacket. The heights of these peaks provide a measure of the strength of each part of the watermark.

At step 610 (which may precede or follow steps 606, 608) the brightness of the data block in question may be determined. This may be done, for example, by calculating an average gray scale value of the pixels in the data block.

After the processing of steps 606, 608, 610 is completed, step 612 is performed. At step 612 it is determined whether there is a correlation between the strength of the watermark and the brightness of the various data blocks, and/or whether there is a correlation between the strength of the watermark data and the wave vectors that were used to encode the watermark in the data used to print the original image. In general, to the extent that the strength of the watermark is negatively correlated with the brightness of the scanned image data blocks, and/or is positively correlated with the wavelength of the wave vectors used to encode the watermark, the likelier it is that the PIUE is a copy rather than an original printed image. This is because the scanning and printing process that may be used to generate a copy tends to destroy watermark features where the image is brighter and to the extent that the watermark features are encoded with shorter wavelengths.

(As used herein and in the appended claims, "wave vector" refers to a set of parameters that define a wave length and an orientation in two-dimensional space of a waveform.)

A classifying algorithm may be employed to determine whether the recovered watermark data from the scanned image data is indicative of an original printed image or a copy. In some embodiments, the classifying algorithm may be a linear classifier. The classifier may have been trained with a large number of known original images and known copies of original images. Other types of classifiers may be used, such as a Bayes classifier, linear regression, linear discriminant analysis, quadratic discriminant analysis, logistic regression, tree-based classifiers, k-nearest neighbor classifier, support vector classifier or support vector machine.

Figure 7:
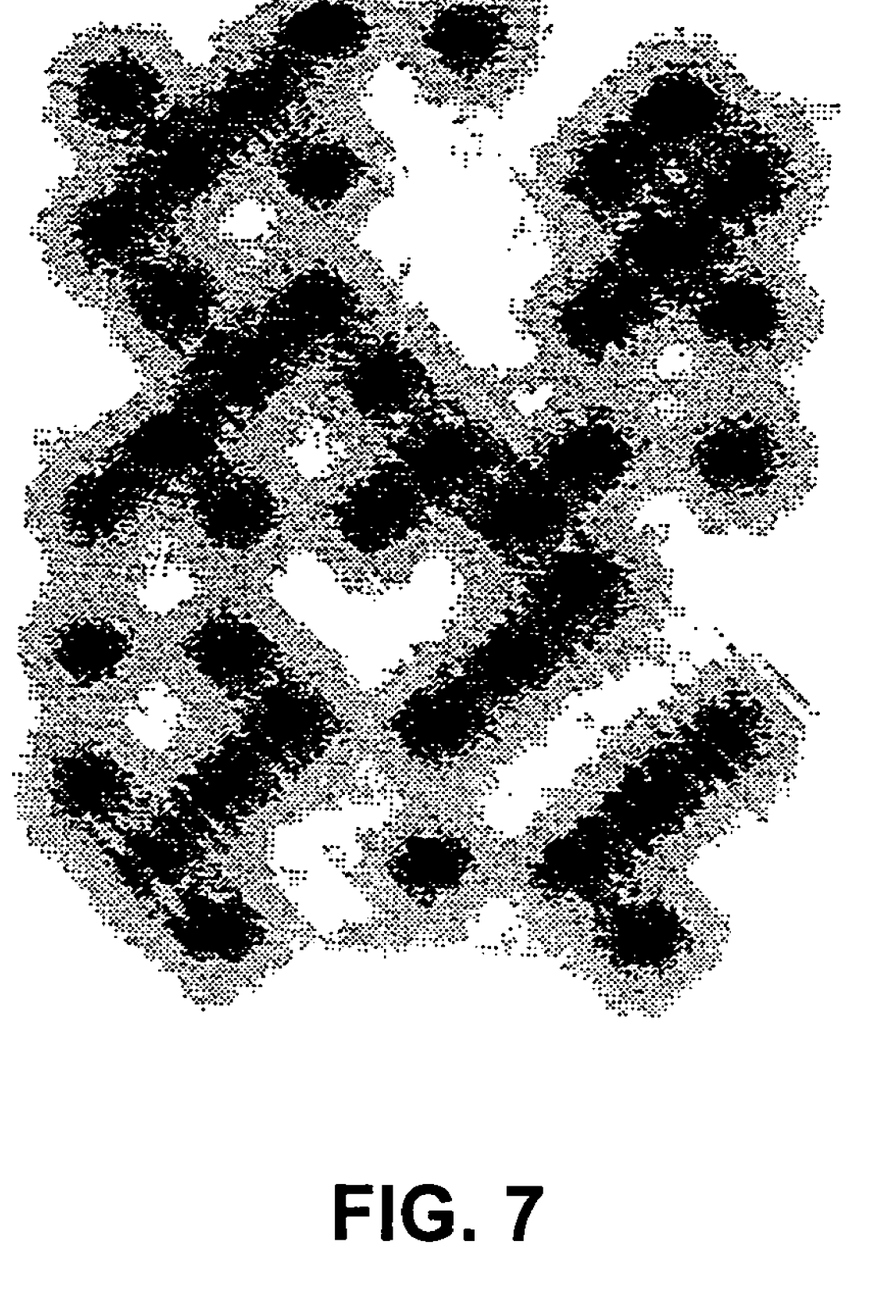
FIG. 7 is a somewhat distorted illustration of a watermark recovered from an original printed document in regard to a particular wave vector used to encode the watermark.

FIG. 7 is an image that shows, in somewhat distorted form due to limitations of reproduction technology, a portion of a watermark that corresponds to a single wave vector and is recovered from an original printed image.

It will be appreciated that a PIUE that has been printed and then scanned for examination will generally result in a set of scanned image data that is distorted as compared to the original image data. It is to prevent distortion of the watermark that the "inverse transformation" of step 206 is applied after application of the watermark. That is, the inverse transformation of step 206 in effect "pre-reverses" the distortion of the print-scan process, so that there is less distortion of the watermark as detected in the examination process of FIG. 6 than would be the case if step 206 were not included. At the same time, it is advantageous to include step 202, so that the appearance of the printed original image produced at step 210 is substantially similar to the image represented by the image data in its condition prior to step 202.

In some embodiments, fewer than all of the pixel blocks of the image data, and/or less than all of the image, may be subjected to the watermarking process. For example, certain parts of the image may be held back from watermarking to preserve esthetic qualities of the image. It is also possible, in some embodiments, that less than all of the PIUE may be examined for the presence of the watermark. Also, lattices other than the D4 lattice may be employed in arraying the message bits.

The phase-space encoded watermarking process described herein can be combined with other types of fragile watermarks, including for example the tonal watermark described in co-pending, commonly-assigned patent application Ser. No. 10/720,664 entitled "Fragile Watermark For Detecting Printed Image Copies".

The data to be encoded with phase-space encoding in accordance with the invention need not be meaningful, but instead can comprise random data or constant data (e.g., all 1's).

With the fragile watermark process described above, the resulting features of the printed image are likely to be affected by the process of copying an original printed image in a manner such that the examination process of FIG. 6 can be used to reliably distinguish between original printed documents (e.g., postage meter indicia) in which the watermark features are substantially present, and copies of original printed documents, with the watermark features having been substantially diluted or partially or largely destroyed by the scan-print process used to make the copies. Thus the present invention can be of substantial value in verifying the authenticity of original documents. The erosion of the watermark in images that are copies rather than originals may be of such a nature that it can be detected using a relatively low-quality scanner.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of documents other than postage indicia. Other variations relating to implementation of the functions described herein can also be implemented. Accordingly, other embodiments are within the scope of the following claims.

What is claimed is:

1. A method of determining whether a printed-image-under-examination (PIUE) is a copy of an original printed image, the method comprising:
   (a) scanning the PIUE to generate scanned image data, the scanned image data comprising pixel data, the pixel data comprising gray scale values and representing the PIUE as a set of scanning pixels;
   (b) forming a plurality of data blocks from the scanned image data, each data block consisting of pixel data which corresponds to a respective region of the PIUE;
   (c) transforming the pixel data in at least some of the data blocks to obtain transform domain data by applying at least one of a Fourier transform, a fast Fourier transform, a discrete cosine transform (DCT) and a wavelet transform to the pixel data in the at least some of the data blocks to obtain the transform domain data;
   (d) applying a watermark detecting operation to the transform domain data for respective ones of the data blocks to generate recovered watermark data; and
   (e) determining a correlation between the recovered watermark data for at least some of the data blocks and a brightness of said data blocks.

2. The method according to claim 1, further comprising:
   (f) determining that the PIUE is a copy of the original printed image if a strength of a brightness level of the recovered watermark data is negatively correlated with the brightness of said data blocks.

3. The method according to claim 1, wherein the watermark detecting operation includes multiplying the transform domain data with a detecting function.

4. The method according to claim 3, wherein the detecting function is $e^{ikr}$, where k and r are phase space indices applicable to the transform domain data.

5. The method according to claim 3, wherein the detecting operation further includes applying an envelope function to the transform domain data that has been multiplied by the detecting function.

6. The method according to claim 5, wherein the detecting operation further includes applying an inverse transform to the transform domain data that has been multiplied by the detecting function and to which the envelope function has been applied.

7. The method according to claim 1, wherein the PIUE is part of a postal indicium.

8. The method according to claim 1, wherein at least one of the regions of the PIUE overlap with one or more other regions of the PIUE to which the data blocks correspond are overlapping with each other.

9. The method according to claim 1, wherein the brightness of said data blocks is determined by calculating an average gray scale value of said data blocks.

10. A method of determining whether a printed-image-under-examination (PIUE) is a copy of an original printed image, the original printed image including a watermark applied to the image using a plurality of wave vectors, the method comprising:
  (a) scanning the PIUE to generate scanned image data, the scanned image data comprising pixel data, the pixel data comprising gray scale values and representing the PIUE as a set of scanning pixels;
  (b) forming a plurality of data blocks from the scanned image data, each data block consisting of pixel data which corresponds to a respective region of the PIUE;
  (c) transforming the pixel data in at least some of the data blocks to obtain transform domain data by applying at least one of a Fourier transform, a fast Fourier transform, a discrete cosine transform (DCT) and a wavelet transform to the pixel data in the at least some of the data blocks to obtain the transform domain data;
  (d) applying a watermark detecting operation to the transform domain data for respective ones of the data blocks to generate recovered watermark data; and
  (e) determining at least one of (i) a correlation between the recovered watermark data for at least some of the data blocks and a brightness of said data blocks, and (ii) a correlation between the recovered watermark data and the wave vectors.

11. The method according to claim 10, further comprising:
  (f) determining that the PIUE is a copy of the original printed image if a signal level of the recovered watermark data decreases with the brightness of said data blocks.

12. The method according to claim 10, further comprising:
  (f) determining that the PIUE is a copy of the original printed image if a signal level of the recovered watermark data increases with wavelengths of the wave vectors.

13. The method according to claim 10, wherein the watermark detecting operation includes multiplying the transform domain data with a detecting function.

14. The method according to claim 13, wherein the detecting function is $e^{ikr}$, where k and r are phase space indices applicable to the transform domain data.

15. The method according to claim 13, wherein the detecting operation further includes applying an envelope function to the transform domain data that has been multiplied by the detecting function.

16. The method according to claim 15, wherein the detecting operation further includes applying an inverse transform to the transform domain data that has been multiplied by the detecting function and to which the envelope function has been applied.

17. The method according to claim 10, wherein the PIUE is part of a postal indicium.

18. The method according to claim 10, wherein at least one of the regions of the PIUE overlap with one or more other regions of the PIUE to which the data blocks correspond are overlapping with each other.

* * * * *